United States Patent

Kinoshita et al.

Patent Number: 5,612,115
Date of Patent: Mar. 18, 1997

[54] METAL-DEPOSITED POLYESTER FILM CAPACITOR

[75] Inventors: Shin-ichi Kinoshita, Tokyo; Hisayoshi Watanabe; Nobuyuki Kume, both of Osaka, all of Japan

[73] Assignees: Diafoil Hoechst Company, Limited, Tokyo; Matsushita Electric Industrial Co., Ltd., Kadoma, both of Japan

[21] Appl. No.: 433,826

[22] Filed: May 4, 1995

Related U.S. Application Data

[63] Continuation of Ser. No. 84,607, Jul. 1, 1993, abandoned.

[30] Foreign Application Priority Data

Jul. 3, 1992 [JP] Japan ..... 4-177237

[51] Int. Cl.$^6$ ..... B32B 15/08; B32B 27/06; B32B 27/00; B32B 27/40
[52] U.S. Cl. ..... 428/141; 428/336; 428/423.7; 428/458; 428/480; 428/906; 428/910
[58] Field of Search ..... 428/402, 423.1, 428/423.7, 425.8, 457, 458, 141, 910, 480, 66, 336, 906

[56] References Cited

U.S. PATENT DOCUMENTS

| | | | |
|---|---|---|---|
| 3,740,254 | 6/1973 | Lansbury et al. | 117/71 |
| 4,241,129 | 12/1980 | Marton et al. | 428/458 X |
| 4,461,797 | 7/1984 | Adachi et al. | 428/910 |
| 4,503,189 | 3/1985 | Igarashi et al. | 525/104 |
| 4,886,700 | 12/1989 | Younes | 428/901 X |
| 4,985,537 | 1/1991 | Utsumi et al. | 528/272 |
| 5,096,980 | 3/1992 | Yamazaki et al. | 525/438 |
| 5,147,726 | 9/1992 | Suzuki et al. | 428/458 |
| 5,225,267 | 7/1993 | Ochi et al. | 428/423.1 X |

FOREIGN PATENT DOCUMENTS 0484956  5/1992  European Pat. Off. .

OTHER PUBLICATIONS

Japanese Abstract 4 069 236, "Metal Vapour Film Useful For Capacitor, Packaging, etc.", Toray Ind. Inc., (1992).

*Primary Examiner*—Paul J. Thibodeau
*Assistant Examiner*—Stephen Sand
*Attorney, Agent, or Firm*—Foley & Lardner

[57] ABSTRACT

A metal-deposited polyester film capacitor made of a laminated or wound metal-deposited polyester film which has, on at least one of its surface, a coating layer containing an aromatic polyurethane and a deposited metal layer on the coating layer, which is excellent in moist-heat resistance and has good long-term reliability.

18 Claims, No Drawings

METAL-DEPOSITED POLYESTER FILM CAPACITOR

This application is a continuation of application Ser. No. 08/084,607, filed Jul. 1, 1993, now abandoned.

BACKGROUND OF THE INVENTION

1. Field of the Invention

The present invention relates to a capacitor comprising a metal-deposited polyester film. More particularly, the present invention relates to a capacitor which comprises a polyester base film and a metal layer deposited thereon with improved adhesion therebetween and is excellent in moist-heat resistance.

2. Description of the Related Art

A polyester film, typically a polyethylene terephthalate film is widely used as a base film of a capacitor since it is excellent in mechanical properties, heat resistance and electrical properties. With the recent progresses in various electronic equipments, the properties of the polyester film have been improved. One of the properties of the polyester film to be improved is a long-term stability against moist heat. That is, a metal-deposited polyester film has a drawback that the adhesion between the base film and the deposited film layer, in particular, the adhesion in a moist heat atmosphere, namely the moist-heat resistant adhesion is insufficient. Though a conventional capacitor is sheathed by an epoxy resin having a sufficient thickness, when it is stored at high temperature and high humidity for a long time, moisture penetrates in an interface between the base film and the deposited metal layer so that an electrostatic capacity of the capacitor greatly decreases due to corrosion of vaporized electrodes. Then, it is highly required to improve the moist-heat resistance of the capacitor in view of the long-term stability.

To this end, it is proposed to coat a low viscosity epoxy resin under reduced pressure instead of atmospheric pressure to penetrate the resin deep into the capacitor using a difference between the inside pressure and the atmospheric pressure. However, the low viscosity epoxy resin foams under reduced pressure and adheres to lead wires, which causes a serious trouble that a solder is hardly applied on the lead wires when the capacitor is soldered to a printed-wiring board. In addition, the capacitor coated by the low viscosity epoxy resin has a poor self-healing property when an excess voltage is applied, so that a withstand voltage of the capacitor is decreased.

As a capacitor having good moist-heat resistance, Japanese Patent Publication Nos. 59612/1990 and 59613/1990 disclose a film capacitor having a coating layer of polyvinylidene chloride, and a film capacitor having a coating layer comprising a melamine resin and/or a urea resin, respectively. However, with the resins disclosed in these Patent Publications, the properties of the capacitor are not necessarily maintained in a high humidity high temperature atmosphere. For example, while the decrease of electrostatic capacity of the capacitor can be prevented at 40° C. in a moist-heat atmosphere, the electrostatic capacity of the capacitor quickly decreases at a temperature of 60° C. or higher in the moist-heat atmosphere.

Since the electronic equipments are remarkably improved recently, demands on the long-term stability, in particular the long-term moist-heat stability of the capacitor properties are still increasing.

SUMMARY OF THE INVENTION

An object of the present invention is to provide a metal-deposited polyester film which has good moist-heat resistant adhesion between a polyester film and a deposited metal layer, and is suitable as a base film of a capacitor.

Another object of the present invention is to provide a capacitor which comprises a metal-deposited polyester film and is excellent in moist-heat resistance.

According to the present invention, there is provided a metal-deposited polyester film capacitor comprising a laminated or wound metal-deposited polyester film which has, on at least one of its surface, a coating layer containing an aromatic polyurethane and a deposited metal layer on said coating layer.

DETAILED DESCRIPTION OF THE INVENTION

Preferred examples of the polyester of the polyester film used according to the present invention are polyethylene terephthalate at least 80% of repeating units of which is ethylene terephthalate, polyethylene naphthalate at least 80% of repeating units of which is ethylene naphthalate and poly-1,4-cyclohexanedimethylene terephthalate at least 80% of repeating units of which is 1,4-cyclohexadimethylene terephthalate. Examples of copolymerizable components other than the above predominant components are diol components such as diethylene glycol, propylene glycol, neopentyl glycol, polyethylene glycol, polytetramethylene glycol, etc.; dicarboxylic acid components such as isophthalic acid, 2,6-naphthalenedicarboxylic acid, 5-sodiumsulfoisophthalic acid, adipic acid, azelaic acid, sebacic acid and their ester-forming derivatives; hydroxymonocarboxylic acids such as hydroxybenzoic acid and its ester-forming derivatives; and the like.

A thickness of the polyester film is preferably from 0.5 to 30 μm, more preferably from 0.8 to 15 μm.

The polyester film to be used in the present invention may contain additive particles, precipitated particles or other catalyst residues, which form protrusions on the film surface in an amount that characteristics of the capacitor are not deteriorated. In addition to such particles, the polyester film may contain other additive such as an antistatic agent, a stabilizer, a lubricant, a cross linking agent, an anti-block agent, an antioxidant, a colorant, a light-shielding agent, a UV-light absorber, and the like in an amount that the characteristics of the capacitor are not deteriorated.

Insofar as the final properties of the polyester film satisfy the requirements of the present invention, the film may have a multi-layer structure. In case of multi-layer structure, a part of the layers may be made of a polymer other than the polyester.

The coating layer of the present invention is formed by applying a coating liquid containing the aromatic polyurethane, preferably a coating liquid containing the aromatic polyurethane and an aliphatic polyurethane on the polyester film and drying it.

A content of the aromatic polyurethane in the coating layer is at least 10% by weight, preferably from 20 to 90% by weight, more preferably from 30 to 80% by weight (based on solid weight). When the content of the aromatic polyurethane in the coating layer is too small, the intended properties of the capacitor may not be achieved.

A content of the optionally used aliphatic polyurethane is usually not more than 90% by weight, preferably from 10 to 80% by weight, more preferably from 20 to 70% by weight (based on solid weight). The use of the aliphatic polyurethane will improve hydrolysis resistance of the coating layer.

As the components constituting the polyurethane such as a polyol, a polyisocyanate, a chain extender and a cross linking agent, the following materials can be exemplified.

Examples of the polyol are polyethers (e.g. polyoxyethylene glycol, polyoxypropylene glycol, polyoxypropylenetriol, polyoxytetramethylene glycol, etc.), polyesters (e.g. polyethylene adipate, polyethylenebutylene adipate, polypropylene adipate, polyhexylene adipate, polycaprolactone, etc.), acrylic polyols, castor oil, and the like.

Examples of the polyisocyanate are aromatic diisocyanates (e.g. tolylene diisocyanate, phenylene diisocyahate, 4,4'-diphenylmethane diisocyanate, 1,5-naphthalene diisocyanate, etc.) and aliphatic diisocyanates (e.g. xylylene diisocyanate, hexamethylene diisocyanate, resin diisocyanate, 4,4'-dicyclohexylmethane diisocyanate, isophorone diisocyanate, etc.).

Examples of the chain extender or the cross linking agent are ethylene glycol, propylene glycol, butanediol, hexanediol, diethylene glycol, trimethylolpropane, glycerol, hydrazine, ethylenediamine, diethylenetriamine, 4,4'-diaminodiphenylmethane, 4,4'-diaminodicyclohexylmethane, water, and the like.

The aromatic polyurethane used in the present invention is a polyurethane comprising an aromatic polyisocyanate as the polyisocyanate component, while the aliphatic polyurethane is a polyurethane comprising an aliphatic polyisocyanate as the polyisocyanate component. In the synthesis of the polyurethane, the aromatic and aliphatic polyisocyanates are often used together and a polyurethane comprising two or more aromatic and aliphatic polyisocyanates in one molecule is preferably used also.

In the present invention, the polyurethane resin is used in the form of a coating liquid comprising water as a medium in view of safety and hygiene, although the coating liquid may contain an organic solvent as an auxiliary agent for a water-soluble or dispersible resin. When water is used as the medium, the polyurethane may be forcedly dispersed by the use of a surfactant. Preferably, the coating liquid is a self-dispersing liquid comprising the resin having a hydrophilic nonionic component such as a polyether or a cationic group such as a quaternary ammonium salt, more preferably a water-soluble or dispersible resin having an anionic group. The water-soluble or dispersible resin having the anionic group is intended to mean a resin to which a compound having an anionic group (e.g. a sulfonic acid, a carboxylic acid, phosphoric acid, or their salts) by copolymerization or graft copolymerization.

To impart water solubility to the polyurethane resin, a counter ion to the anionic group can be an alkali metal ion. In view of the moist-heat resistance of the capacitor, the counter ion is preferably selected from amine onium ions including ammonium ion. An amount of the anionic group in the water-soluble or dispersible coating agent is preferably from 0.05 to 8% by weight (based on solid weight). When the amount of the anionic group is less than 0.05% by weight, water solubility or dispersibility of the resin may be insufficient. When the amount of the anionic group exceeds 8% by weight, water resistance of the coating layer may be deteriorated, or the coating layer absorbs moisture so that the films may block each other, or the moist-heat resistant adhesion may be deteriorated.

To improve the anti-blocking property, water resistance, solvent resistance and mechanical properties of the coating layer, the coating liquid may contain, as a cross linking agent, an isocyanate compound, an epoxy compound, an amine compound, an aziridine compound, a silane coupling agent, a titanium coupling agent, a zircoaluminate coupling agent, a peroxide, a heat or light-reactive vinyl compound of a photosensitive resin.

To improve the anti-blocking property or a lubricating property, the coating liquid may contain inorganic fine particles such as silica, silica sol, alumina, alumina sol, zirconium sol, kaolin, talc, calcium carbonate, calcium phosphate, titanium oxide, barium sulfate, carbon black, molybdenum sulfide, antimony oxide sol, etc., and organic fine particles such as polystyrene, polyethylene, polyamide, polyester, polyacrylate, epoxy resin, silicone resin, fluororesin, etc. in an amount that surface roughness of the coating layer is in the range described below.

If necessary, the coating liquid may contain an antifoaming agent, a coating-property improver, a tackifier, an antistatic agent, an organic lubricant, an antioxidant, a UV-light absorber, a foaming agent, a dye or a pigment.

An amount of the alkali metal in the coating liquid is preferably 1000 ppm or less, more preferably 500 ppm or less, in particular 200 ppm or less of the solids in the liquid. When the amount of the alkali metal in the coating liquid is too large, the moist-heat resistance of the capacitor tends to decrease. The contamination of the alkali metal in the coating liquid is unavoidable in the course from the preparation of the raw material to the preparation of the coating liquid in the industrial production of the capacitor. To prepare the coating liquid, tap water or ground water is often used. If necessary, the coating liquid is deionized to obtain the liquid having the desired alkali metal ion content.

The above coating liquid is applied on the polyester film by any of conventional coating apparatuses such as a reverse roll coater, a gravure coater, a rod coater, an air doctor coater, or other coating apparatus in a separate step from the production step of a biaxially oriented polyester film or, preferably, in the production step of the film.

For applying the coating liquid in the production step of the polyester film, the coating liquid may be applied on an unoriented polyester and then the film is succesively or simultaneously oriented, the coating liquid may be applied on a uniaxially oriented polyester film and then the film is oriented in a direction perpendicular to the previous orientation direction, or the coating liquid is applied to the biaxially oriented polyester film and then the film is further oriented in the machine and/or transverse directions.

The orientation of the polyester film is carried out preferably at a temperature of 60° to 130° C., and a draw ratio is at least 4 times, preferably from 6 to 20 times in terms of an area ratio. The oriented film is heat treated at a temperature of 150° to 250° C. Further, the film is preferably shrunk by 0.2 to 20% in the machine and transverse directions in a maximum temperature zone in the heat treatment and/or a cooling zone at an exit from the heat treatment. In particular, the coating liquid is applied to the uniaxially oriented polyester film which has been prepared by roll stretching at a temperature of 60° to 130° C. at a draw ratio of 2 to 6 times and optionally dried and then, the uniaxially oriented polyester film carrying the coating liquid or the coating layer is oriented in a direction perpendicular to the previous orientation direction at a temperature of 80° to 130° C. at a draw ratio of 2 to 6 times and heat treated at a temperature of 150° to 250° C. for 1 to 600 seconds.

According to the above methods, it is possible to dry the coating liquid at the same time as the orientation and reduce the thickness of the coating layer depending on the draw ratio of the film.

The coating liquid may be applied on one surface of the polyester film, while it may be applied on both surfaces of the polyester film. When the coating liquid applied on one surface, a coating layer other than the coating layer of the present invention may be formed on the other surface of the film to impart other properties to the film.

To improve the coating property and adhesion of the coating liquid to the film surface, the polyester film may be subjected to chemical treatment or discharge treatment before the application of the coatings liquid.

To improve the adhesion or coating property on the surface of the coating layer formed by the present invention, the coating layer surface may be subjected to the discharge treatment.

A thickness of the coating layer is preferably from 0.01 to 3 μm, more preferably from 0.02 to 1 μm. The thinner coating layer is more preferred in view of the demand for miniaturization of the capacitor. If the thickness of the coating layer is less than 0.01 μm, the coating layer tends to have coating unevenness.

Preferably, the formed coating layer has a water droplet contact angle of at least 60°. When the water droplet contact angle is less than 60°, the metal-deposited film may have insufficient water resistant adhesion between the coating layer and the deposited metal layer. To this end, an amount of hydrophilic groups, an amount of an emulsifier and/or an amount of a hydrophilic compound in the coating liquid are suitably adjusted.

Preferably, a surface of the formed coating layer has a center line average surface roughness (Ra) of 0.005 to 0.5 μm, more preferably from 0.01 to 0.3 μm, in particular from 0.02 to 0.2 μm. When Ra is less than 0.005 μm, the surface may have an insufficient slip property. When Ra exceeds 0.5 μm, the surface is too rough so that the withstand voltage and/or the moist-heat resistance of the capacitor may be deteriorated.

In the present invention, metals to be deposited on the coating layer include aluminum, palladium, zinc, nickel, gold, silver, copper, indium, tin, chromium, titanium and mixtures thereof, though the metals are not limited to the above ones. Among them, aluminum is preferred. The metal may be used in the form of its oxide.

A thickness of the deposited metal layer is preferably from 10 to 5000 Å. The metal may be usually deposited by vacuum metallization, while electroplating or sputtering may be employed. The deposited metal layer may be formed on both surfaces of the polyester film. After metal deposition, the surface of the deposited metal may be surface treated, or coated with a resin.

Then, at least two of the metal-deposited polyester films of the present invention are laminated and wound, or a double metal-deposited polyester film of the present invention and other film including a polyester film are laminated and wound to obtain the capacitor element. Alternatively, two or more metal-deposited polyester films are simply laminated to obtain the capacitor element. Then, the capacitor element is subjected to heat press, taping metallicon treatment, voltage treatment, edge sealing, lead wire bonding, etc. to assemble the capacitor.

In view of the long-term reliability of the capacitor, a change rate of the electrostatic capacity is preferably from −10% to +10% when the capacitor is kept standing at 60° C., 95 %RH for 1000 hours while applying a direct current of 60 V/μm.

PREFERRED EMBODIMENTS OF THE INVENTION

The present invention will be illustrated by the following Examples, which do not limit the scope of the present invention. In Examples, "part" are by weight.

In Examples, the properties are measured or evaluated by the following methods.

(1) Analysis of alkali metal ions

Using an atomic absorption spectrophotometer (Spectro AA manufactured by Varian Co., Ltd.), amounts of Li, Na, K, Rb, Cs and Fr are measured according to a calibration curve method.

(2) Center line average surface roughness Ra

Using a surface roughness tester (SE-3F manufactured by Kosaka Kenkyusho, Ltd.), the center line average surface roughness Ra is measured according to JIS B-0601-1976, with necessary modification. The measuring conditions include the use of a contact needle having a tip radius of 2 μm, 30 mg of probe contact pressure, 0.08 mm of cutoff, and 2.55 mm of a measuring length. The measurement is performed at 10 points on the film and the measured values are averaged.

(3) Water droplet contact angle

Using a contact angle meter (Type CA-DT-A manufactured by Kyowa Interface Chemistry Co., Ltd.), a contact angle of distilled water on a sample film is measured in a 50 %RH atmosphere. The contact angles are measured with three water droplets at two side points of each droplet, in total, six points, and averaged. A diameter of a droplet is 2 mm, and the contact angle is measured after one minute from dropping water on the sample film.

(4) Evaluation of adhesion

On the metal deposited layer surface, a polyurethane two-part adhesive comprising AD-502 (urethane adhesive) (100 parts) and CAT-10 (isocyanate haredener) (10 parts) (manufactured by Toyo Morton Co., Ltd.) is coated at a dry weight of 5 g/m². On the adhesive layer, a polyester film having the same thickness as the base polyester film is laminated by dry laminating, followed by aging at 40° C. for 48 hours. The laminate is cut to a rectangular form and dipped in water kept at 50° to 55° C. (warm water treatment).

A part of an edge of the sample which has been subjected to the warm water treatment was peeled and subjected to the T-shape peeling test at a peeling rate of 100 mm/min. using a peeling tester. The adhesion is evaluated according to the following criteria:

O: 100 g<Peeling load.
Δ: 10 g<Peeling load≦100 g.
X: Peeling load≦10 g.

(5) Withstand voltage

The withstand voltage is measured according to JIS C-2319.

Using a 10 kV direct current withstand voltage tester, a voltage applied to a capacitor is increased at a rate of 100 V/sec. at 23° C., 50 %RH. The voltage at which the capacitor is broken and short-circuited is recorded as the withstand voltage.

(6) Change of electrostatic capacity

A capacitor is-kept standing at 60° C., 95 %RH for 1000 hours while applying, between a pair of electrodes of the capacitor, a direct current of 60 V/μm. Then, a change rate of an electrostatic capacity is calculated by dividing a difference between the electrostatic capacity after 1000 hours and the original electrostatic capacity of the capacitor by the original electrostatic capacity and expressed in a percentage.

EXAMPLE 1

Synthesis of Polyurethane

To a polyesterpolyol prepared from terephthalic acid (664 parts), isophthalic acid (631 parts), 1,4-butanediol (472 parts) and neopentyl glycol (447 parts), adipic acid (321 parts) and dimethylolpropionic acid (268 parts) were added and reacted to obtain a carboxyl group-containing polyesterpolyol. To the carboxyl group-containing polyesterpolyol (1880 parts), tolylene diisocyanate (160 parts) was added to obtain an aromatic polyesterpolyurethane solution. The resulting solution was poured in an aqueous ammonia to remove the solvent, whereby an aqueous dispersion of the aromatic polyesterpolyurethane (A) was obtained.

Separately, in the same manner as above except that 4,4'-dicyclohexylmethane diisocyanate was used in place of tolylene diisocyanate, an aqueous dispersion of an aliphatic polyesterpolyurethane (B) was obtained.

Production of Polyester Film

A mass of polyethylene terephthalate having an intrinsic viscosity of 0.66 and containing 0.3 % of silica particles having an average particle size of 1.2 μm was melt extruded at 290° C. to produce an amorphous sheet. After the amorphous sheet was stretched in a machine direction at 90° C. at a draw ratio of 4.2 times, a coating liquid containing the above aromatic polyesterpolyurethane (A) (50 parts in terms of a solid component) and the above aliphatic polyesterpolyurethane (50 parts) in water as a medium was coated on both surfaces of the uniaxially oriented polyester film. Then, the film was stretched in a transverse direction at 110° C. at a draw ratio of 3.9 times and heat treated at 230° C. to obtain a biaxially oriented polyester film having a thickness of 5 μm and a coating layer of 0.04 μm in thickness.

The amounts of alkali metals in the coating liquid were 44 ppm of Na and 5.8 ppm of K based on the solid component in the liquid, while the amounts of other alkali metals were below the limit of detection. The water droplet contact angle on the coating layer was 63°, and the center line average surface roughness Ra was 0.020 μm.

Assembling of Capacitor

On the coating layer of the polyester film, aluminum was vacuum metallized to a thickness of 450 Å using a resistance heating type metallizing apparatus under a reduced pressure of $10^{-4}$ Torr. or lower in a vacuum chamber. The aluminum was deposited in a stripe form with leaving a margin area in the longitudinal direction of the polyester film. That is, the deposited areas each of 8 mm in width and the margin areas each of 1 mm in width were alternately formed.

The metal-deposited polyester film was slit to obtain a tape having a margin area of 1 mm in width on the right or left edge of the tape.

The obtained tape had good adhesion in the, evaluation of adhesion.

One left-margined tape and one right-margined tape were laminated and wound while shifting their positions so that the metal-deposited part of 0.5 mm extended beyond the edge of the other tape in each side to obtain a wound body.

The wound body was pressed at 150° C. under pressure of 50 kg/cm$^2$ for 5 minutes. After pressing, a metallicon was spray coated on the both edge surfaces of the wound body, and lead wires were bonded. Thereafter, the wound body was dipping in a liquid bisphenol A epoxy resin and coated with a powder epoxy resin by heating and melting it to form a sheath having a minimum thickness of 0.5 mm to obtain a film capacitor having an electrostatic capacity of 0.1 μF.

As shown in Table 2, the produced metal-deposited film capacitor was excellent in withstand voltage and moist-heat resistance and had a small change rate of the electrostatic capacity.

COMPARATIVE EXAMPLE 1

In the same manner as in Example 1 except that no coating liquid was applied, a metal-deposited polyester film capacitor was produced.

The produced capacitor had inferior moist-heat resistance to the capacitor of Example 1.

EXAMPLES 2–4 AND COMPARATIVE EXAMPLE 2

In the same manner as in Example 1 except that a coating liquid having a composition shown in Table 1 was used, a metal-deposited polyester film capacitor was produced.

COMPARATIVE EXAMPLE 3

In the same manner as in Example 1 except that, to the coating liquid, sodium chloride was added to increase the Na content to 2000 ppm while the K content was remained unchanged and the contents of other alkali metals were still below the limit of detection, a metal deposited polyester film capacitor was produced.

The produced capacitor had inferior moist-heat resistance to the capacitor of Example 1.

The properties of the capacitors produced in Examples and Comparative Examples are shown in Table 2.

TABLE 1

| Example No. | Polyurethane amount (parts) | | Metal contents in coating liquid (ppm) | | | Ra (μm) | Water droplet contact angle (degree) |
| --- | --- | --- | --- | --- | --- | --- | --- |
| | A | B | Na | K | others | | |
| 1 | 50 | 50 | 44.0 | 5.8 | ≈0 | 0.020 | 63 |
| 2 | 100 | 0 | 41.9 | 4.8 | ≈0 | 0.020 | 63 |
| 3 | 70 | 30 | 46.5 | 5.9 | ≈0 | 0.020 | 63 |
| 4 | 30 | 70 | 52.0 | 4.6 | ≈0 | 0.020 | 63 |
| C. 1 | 0 | 0 | — | — | — | 0.020 | 66 |
| C. 2 | 0 | 100 | 50.9 | 5.6 | ≈0 | 0.020 | 63 |
| C. 3 | 50 | 50 | 2000 | 5.8 | ≈0 | 0.020 | 62 |

TABLE 2

| Example | Adhesion of metal-deposited film | Capacitor | |
|---|---|---|---|
| | | Withstand voltage (kV/μm) | Change rate of electrostatic capacity (%) |
| 1 | O | 0.56 | 4.5 |
| 2 | O | 0.56 | −0.9 |
| 3 | O | 0.56 | 5.5 |
| 4 | O | 0.56 | 2.0 |
| C. 1 | X | 0.55 | −42.5 |
| C. 2 | Δ | 0.56 | −10.5 |
| C. 3 | O | 0.56 | −22.2 |

What is claimed is:

1. A metal-deposited polyester film capacitor formed by laminating or winding a polyester film,
   wherein the polyester film comprises a polyester base film which has on at least one of its surfaces a coating layer containing a water-soluble or water-dispersible aromatic polyurethane and an aliphatic polyurethane,
   wherein the coating layer comprises 30 to 80% by weight of said aromatic polyurethane and 20 to 70% by weight of said aliphatic polyurethane, both based on the total weight of the coating layer, and
   wherein the coating layer further comprises alkali metal in a concentration of not more than 1000 ppm and
   wherein a deposited metal layer is on said coating layer, such that the coating layer is located between the polyester base film and the deposited metal layer.

2. The metal-deposited polyester film capacitor according to claim 1, wherein said polyester is at least one polyester selected from the group consisting of polyethylene terephthalate at least 80 mol % of repeating units of which is ethylene terephthalate, polyethylene naphthalate at least 80 mol % of repeating units of which is ethylene naphthalate, and poly-1,4-cyclohexanedimethylene terephthalate at least 80 mol % of repeating units of which is 1,4-cyclohexadimethylene terephthalate.

3. The metal-deposited polyester film capacitor according to claim 1, wherein said coating layer contains a cross linking agent.

4. The metal-deposited polyester film capacitor according to claim 1, wherein said coating layer further contains one or more particles selected from the group consisting of organic and inorganic particles.

5. The metal-deposited polyester film capacitor according to claim 1, wherein said polyester film is a biaxially oriented polyester film.

6. The metal-deposited polyester film capacitor according to claim 1, wherein the thickness of said coating layer is from 0.01 to 3 μm.

7. The metal-deposited polyester film capacitor according to claim 1, wherein said coating layer has a water droplet contact angle of at least 60°.

8. The metal-deposited polyester film capacitor according to claim 1, wherein said coating layer has a center line average surface roughness Ra of from 0.005 to 0.5 μm.

9. The metal-deposited polyester film capacitor according to claim 1, wherein said deposited metal layer is formed from at least one metal selected from the group consisting of aluminum, palladium, zinc, nickel, gold, silver, copper, indium, tin, chromium and titanium.

10. The metal-deposited polyester film capacitor according to claim 1, wherein the thickness of said deposited metal layer is from 10 to 5000 Å.

11. The metal-deposited polyester film capacitor according to claim 1, wherein the aromatic polyurethane contains an anionic group.

12. The metal-deposited polyester film capacitor according to claim 11, wherein an alkali metal ion acts as a counter ion to the anionic group.

13. The metal-deposited polyester film capacitor according to claim 1, wherein the capacitor comprises at least two of the polyester films which are wound or laminated together.

14. The metal-deposited polyester film capacitor according to claim 1, wherein the capacitor further comprises lead wires.

15. The metal-deposited polyester film capacitor according to claim 1, wherein the capacitor has a change rate of electrostatic capacity of from −10% to 10% when the capacitor is kept standing at 60° C. and 95% RH for 1000 hours while applying a direct current of 60 V/μm.

16. The metal-deposited polyester film capacitor according to claim 1, wherein the capacitor comprises at least two polyester films which are laminated and wound together, a metallic spray coating on edge surfaces of the wound capacitor, and lead wires.

17. The metal-deposited polyester film according to claim 1, wherein the coating layer comprises not more than 500 ppm of alkali metal.

18. The metal-deposited polyester film according to claim 1, wherein the coating layer comprises not more than 200 ppm of alkali metal.

* * * * *